(12) United States Patent
Dan et al.

(10) Patent No.: US 7,401,117 B2
(45) Date of Patent: Jul. 15, 2008

(54) SYSTEM AND METHOD FOR COMPOSITE BUSINESS INTERACTIONS IN ELECTRONIC COMMERCE

(75) Inventors: Asit Dan, Pleasantville, NY (US);
Daniel Manuel Dias, Mohegan Lake, NY (US); Pradeep Janakiraman, Tamil Nadu (IN); Ashis Tarafdar, Newtonville, MA (US)

(73) Assignee: International Business Machines Corporation, Armonk, NY (US)

( * ) Notice: Subject to any disclaimer, the term of this patent is extended or adjusted under 35 U.S.C. 154(b) by 1500 days.

(21) Appl. No.: 10/165,926

(22) Filed: Jun. 10, 2002

(65) Prior Publication Data

US 2003/0229503 A1 Dec. 11, 2003

(51) Int. Cl.
*G06F 15/16* (2006.01)
*G06F 9/46* (2006.01)

(52) U.S. Cl. .................. 709/203; 709/202; 709/205; 705/5; 705/8; 719/328; 718/101

(58) Field of Classification Search ........................ None
See application file for complete search history.

(56) References Cited

U.S. PATENT DOCUMENTS

| | | | | |
|---|---|---|---|---|
| 6,055,562 A | * | 4/2000 | Devarakonda et al. | 709/202 |
| 6,920,143 B1 | * | 7/2005 | Ortiz et al. | 370/401 |
| 6,971,096 B1 | * | 11/2005 | Ankireddipally et al. | 718/101 |
| 2002/0042810 A1 | * | 4/2002 | Minami et al. | 709/203 |
| 2002/0087366 A1 | * | 7/2002 | Collier et al. | 705/5 |
| 2003/0036929 A1 | * | 2/2003 | Vaughan et al. | 705/5 |
| 2006/0293931 A1 | * | 12/2006 | Fitzgerald et al. | 705/5 |

* cited by examiner

*Primary Examiner*—Wen-Tai Lin
(74) *Attorney, Agent, or Firm*—Duke W. Yee; Kevin M. Jordan; Lisa L. B. Yoeiss

(57) ABSTRACT

A method, system, computer program product, and data structure for processing requests for services in a networked data processing system is provided. In one embodiment a request is received by a service provider. The request includes defined allowable actions and request definition compositions. The request also includes a plurality of actions wherein the relationships between the plurality of actions are defined. The service provider processes the plurality of actions according to the defined relationships and generates a response.

12 Claims, 6 Drawing Sheets

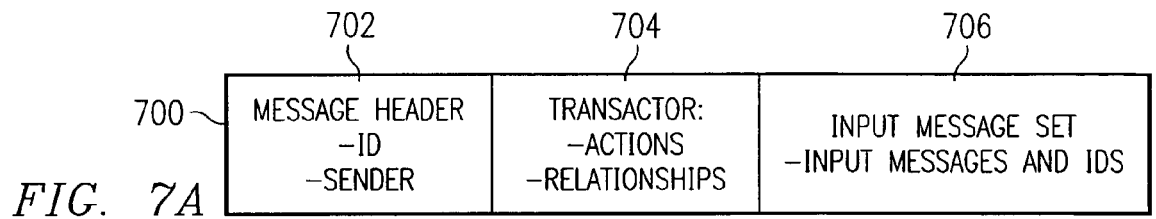
FIG. 7A
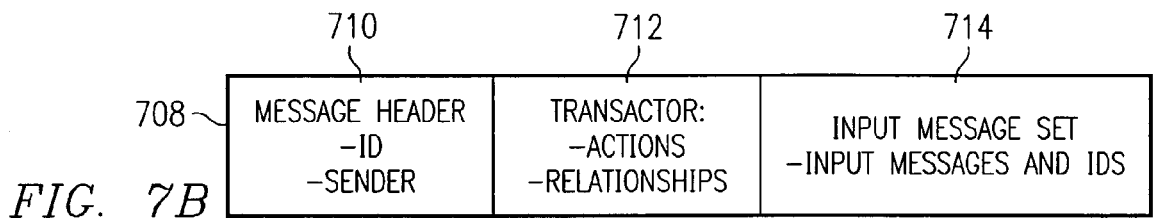
FIG. 7B
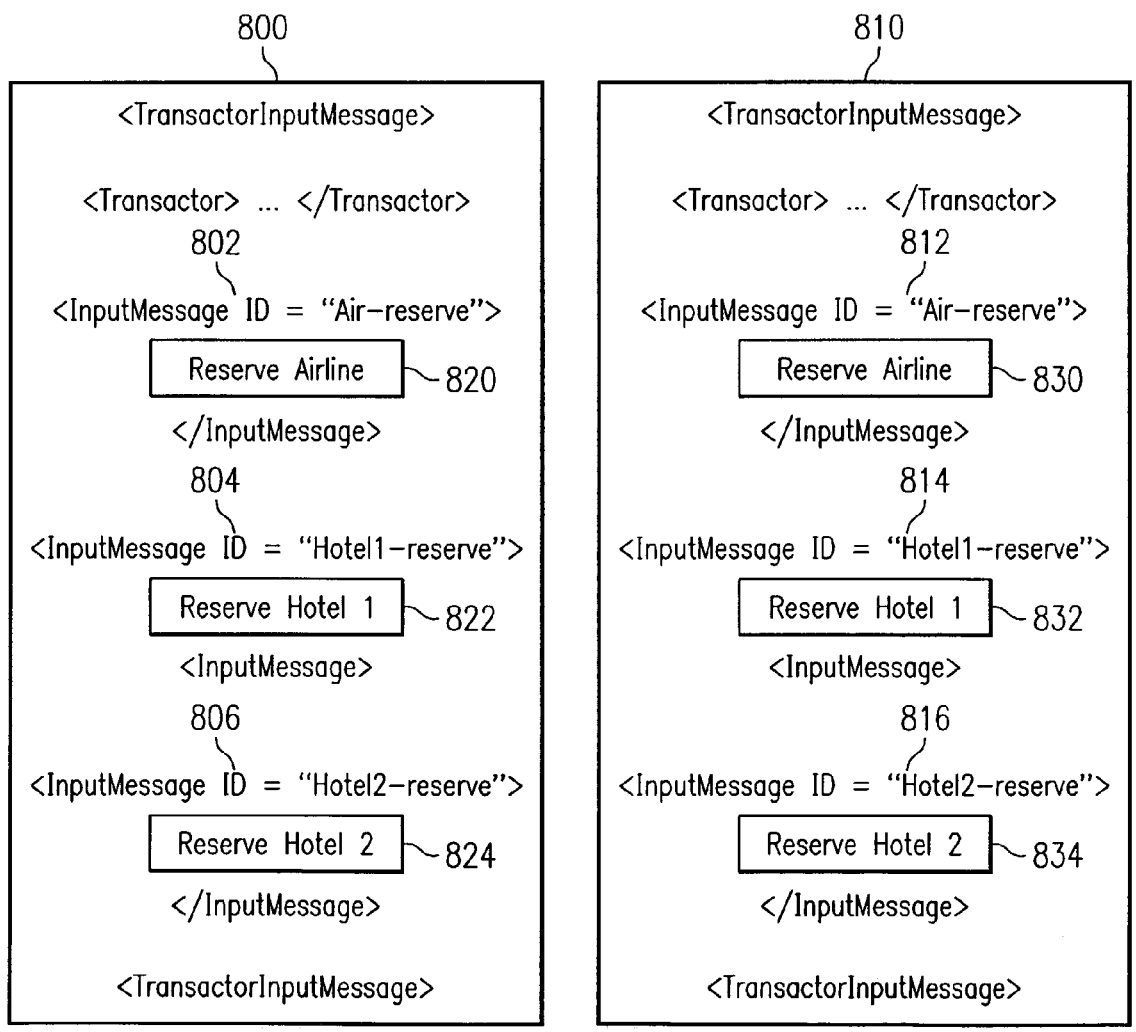
FIG. 8A
FIG. 8B

FIG. 9A

```
      <Group Type="combination">
904 —<Action> Reserve Airline </Action>
906 —<Action> Reserve Hotel 1 </Action>
      </Group>
```

FIG. 9B

```
      <Group Type="selection">
908 —<Action> Reserve Hotel 1 </Action>
910 —<Action> Reserve Hotel 2 </Action>
      </Group>
```

FIG. 10A

```
       <Group Type="combination" Ordered="yes">
1002 —<Action> Reserve Airline </Action>
1004 —<Action> Reserve Hotel 1 </Action>
       </Group>
```
—1010

FIG. 10B

```
       <Group Type="selection" Ordered="yes">
1006 —<Action> Reserve Hotel 1 </Action>
1008 —<Action> Reserve Hotel 2 </Action>
       </Group>
```
—1012

FIG. 11

```
1102 —<Group Type="combination" >Ordered="yes" Atomic="yes"
       1108 —<Action> Reserve Airline </Action>
              <Action> Reserve Hotel 1 </Action>
       </Group>
```
1104  1106

```
<Group Type="combination"> Ordered="yes">
1202 — <Action> Reserve Airline </Action>
       <Group Type="selection"> Ordered="yes">
1204 — <Action> Reserve Hotel 1 </Action>
1206 — <Action> Reserve Hotel 2 </Action>
       </Group>
</Group>
```

FIG. 13

```
<Group Type="selection">
  <Group Type="combination">
1310 { <Action> Reserve Airline 1 </Action> — 1302
     { <Action> Reserve Hotel 1 </Action> — 1304
    <Integrity Rule> all-or-fail </Integrity Rule>
  </Group>
  </Group> Type="combination">
1312 { <Action> Reserve Airline 1 </Action> — 1306
     { <Action> Reserve Hotel 2 </Action> — 1308
    <Integrity Rule> all-or-fail </Integrity Rule>
  </Group>
</Group>
```

FIG. 14

```
1402 — <Group Type="combination"> Ordered="yes">
1404 — <Action ID="a1" InputID="i1"> Reserve Hotel 1 </Action> — 1408
       <Action ID="a2" InputID="a1"> Pay for Reservation </Action> — 1410
       </Group>
                    1412   1406
```

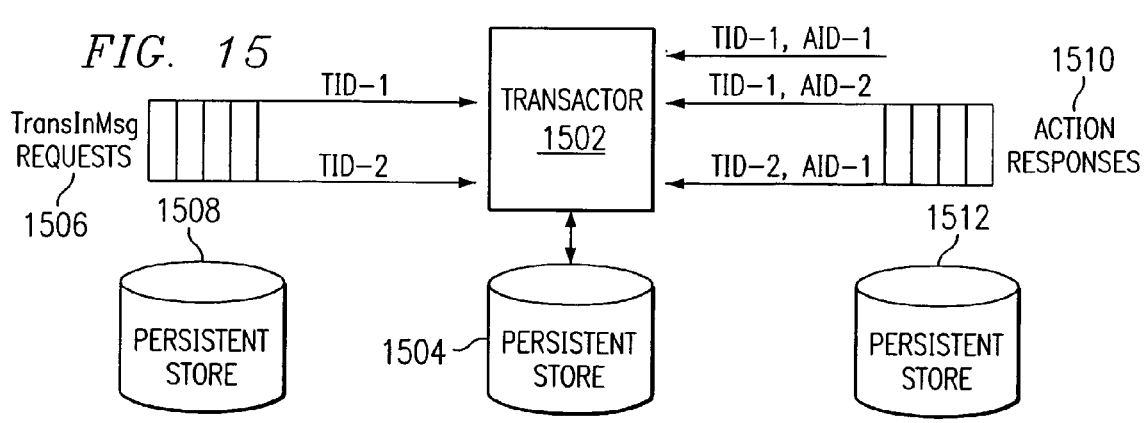

FIG. 15

SYSTEM AND METHOD FOR COMPOSITE BUSINESS INTERACTIONS IN ELECTRONIC COMMERCE

BACKGROUND OF THE INVENTION

1. Technical Field

The present invention relates generally to computer software and more specifically to methods for facilitating business to business interactions in electronic commerce.

2. Description of Related Art

Automating business to business interactions is an important problem in electronic commerce. With the increase in the automation of internal business processes of organizations, there is a demand for building systems to address the issues of seamlessly automating long running business to business interactions. Several approaches have been adopted to address this problem.

Currently, there are peer business applications that interact through simple request/response interactions. The communications between the businesses are guided by well defined protocols for exchanging the requests and responses. The request/response interactions may be either synchronous or asynchronous. An example of a synchronous interaction could be a HTTP request by one business, which triggers a business process inside the peer business system and finally gets a response when the processing of the request is completed. Alternatively, asynchronous requests and responses are sent as separate messages, i.e., the server processes a request asynchronously, and sends a response back to the requester.

For example, referring to FIG. 1, a block diagram of a typical prior art business-to-business interaction is depicted. In the prior art, a business A 102, implemented as a data processor, sent a request 106 to business B 104, also implemented as a data processor. Business B 104 then sent an acknowledgment 108 back to business A 102 and then a response 110. The second request 112 is then sent from business A 102 to business B 104. This second request 112 may depend on the results of the response 110 to the first request 106. Business B 104 then sends an acknowledgment 114 back to business A 102 and then a response 116 after the request 112 has been processed.

Electronic service contracts help simplify the setting up of long standing business relationships. Electronic service contracts may define either synchronous or asynchronous processes. Synchronous refers to events that are synchronized, or coordinated, in time, whereas, in contrast, asynchronous refers to events that are not synchronized, or coordinated, in time. An example of asynchronous interaction could be requests made using the Coyote Business Process Framework as described in U.S. Pat. No. 6,148,290 which is hereby incorporated herein by reference for all purposes. Contracts explicitly specify the messages that are exchanged for requests and responses. The Coyote business process framework provides a base for setting up and conducting long running asynchronous transactions.

All of the approaches described above require the exchange of several messages back and forth for each process (each process may include multiple requests) before a desired result could be achieved. Typically an alternative action or a successive action is requested only after the results of the preceding action are known to the requesting business. This results in long delays and longer connectivity between the partners.

Thus, for example, business A 102 may be an agent purchasing airline tickets and hotel accommodations for a traveler. However, suppose the traveler is unwilling to travel unless airline tickets are obtained for less than a specified amount. Business A 102 must then await the response related to the request for airline tickets before submitting the request for hotel accommodations. However, such a wait is time consuming and also may result in hotel accommodations at a preferred location becoming unavailable during periods of high demand.

Among the other models that address the business to business interactions are mobile agents that are dispatched from one business to another. The mobile agents are software defined by a programming language or a scripting language which can be executed or interpreted by the node at which the agent is deployed. The peer business system then executes the logic packaged into the mobile agent and then responds with the results of the actions.

Prior art approaches to solve this problem have tried to use mobile agent technology as shown in FIG. 2. In this case, mobile agents 206 and 208, which are arbitrary programs written in high-level programming languages, contain the logic for generating multiple requests 210 to be performed by business B 204, the decision logic to be adopted after the outcome of each action, as well as generating the final responses 212. There are many problems however with this scenario as illustrated by Stefan Pleisch in IBM Research Report RZ 3152 State of the Art of Mobile Agent Computing—Security, Fault Tolerance, and Transaction Support, IBM Zurich Research Lab, 1999.

First, there is the problem of persistence and fault-tolerance. The mobile agent depends on the mobile agent execution system to provide persistent storage and tolerance to faults. This is especially essential in an ecommerce setting since ecommerce interactions are typically long-running and may take days or even weeks. However, the state to be made persistent in mobile agents is not explicitly defined and it is difficult for a server business to give any kind of guarantees.

Second, there is the problem of transaction support. Ecommerce interactions often require ACID transaction guarantees or possibly weaker transaction guarantees across multiple requests (may use compensating transactions). Again, the mobile agent execution system would have to provide these support to the mobile agent. This is difficult to do since the server system does not have an explicit understanding of the mobile agent code.

Third, there is the problem of resource control. An arbitrary piece of Java code may invoke any actions in an uncontrolled manner leaving the mobile agent execution system responsible for determining the access control policies. Again, this is difficult to achieve in a mobile agent setting because of the lack of well-defined, mutually-agreed-on policies (contracts) between the server and client.

Fourth, there is the problem of complexity. Writing a mobile agent is a non-trivial task requiring programming in a programming language. It is also procedural rather than declarative in style (for mobile agents written in imperative languages). The business logic may not require this full complexity and it does not make the composition semantics explicit as in a declarative style.

Therefore, it would be desirable to have a system and data structure for processing service requests such that recovery of previous steps is possible after failure and, additionally, in a manner that does not compromise the security of the computer receiving the requests.

SUMMARY OF THE INVENTION

The present invention provides a method, system, computer program product, and data structure for processing requests for services in a networked data processing system. The present invention addresses the issue of achieving the execution of a complex composite requests without suffering from the drawbacks (i.e., lack of support for persistence, transactional execution and security) mentioned earlier. The transactor model provides a framework for composing complex business requests and presenting it to the peer business and achieving the desired execution without having to exchange several messages back and forth. A composite request is expressed as a composition of multiple requests or actions, that captures the data & execution dependency across actions as well as integrity constraints to be followed during execution. It also expresses the response format of a composite request. The composite request adheres to the composition constructs, any additional constraints on composition as well as allowable request set specified via a service contract. The compositional construct describes how the service provider is to select an action to be executed from a set of actions and how a set of requests are to be executed. The compositional construct can also be applied recursively to make a more complex request. The integrity rules associated with each grouping of actions may provide a priority order in which the actions should be executed, whether the actions should be executed as an "all or nothing" arrangement, and whether the actions should be executed for as long as a constraint is not violated (i.e., constraint on any variable, e.g., total dollar amount, etc.). The data flow relationships specify whether the output from one action should be used as the input for another action. Each group in the compositional construct can be defined such that any one action from the group is selected for execution or that all actions are executed.

The transactor framework overcomes the drawbacks of general agent codes written in a programming language. First, the service contract explicitly specifies allowable requests, and composition rules, and hence, there is no security exposure. Second, transaction or any other integrity requirements are expressed declaratively and hence, can be supported by the peer business system. This also simplifies business logic (since it is expressed via declarative specification) while supporting asynchronous and disconnected operations. Finally, the composite request reduces latency since the client needs to make only one invocation instead of many.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A-7B depict diagrams illustrating a transactor input and output message data structures in accordance with the present invention;

FIGS. 8A-8B depict diagrams illustrating an exemplary transactor data structure input message and output message in accordance with the present invention;

FIGS. 9A-9B depict diagrams illustrating exemplary portions of a transactor data structure in accordance with the present invention;

FIGS. 10A-10B depict diagrams illustrating exemplary portions of a transactors data structure in FIGS. 9A-9B with additional criteria in accordance with the present invention;

FIG. 11 depicts a diagram illustrating another example of conditions that may be placed in a transactor data structure in accordance with the present invention;

FIG. 12 depicts a diagram illustrating a portion of a transactor data structure illustrating hierarchical groups in accordance with the present invention;

FIG. 13 depicts a diagram illustrating an exemplary portion of a transactor data structure illustrating integrity rules in accordance with the present invention;

FIG. 14 depicts a diagram illustrating an exemplary portion of a transactor data structure in accordance with the present invention; and FIG. 15 depicts a block diagram illustrating an exemplary transactor implementation in accordance with the present invention.

DETAILED DESCRIPTION OF THE PREFERRED EMBODIMENT

Figure 1:
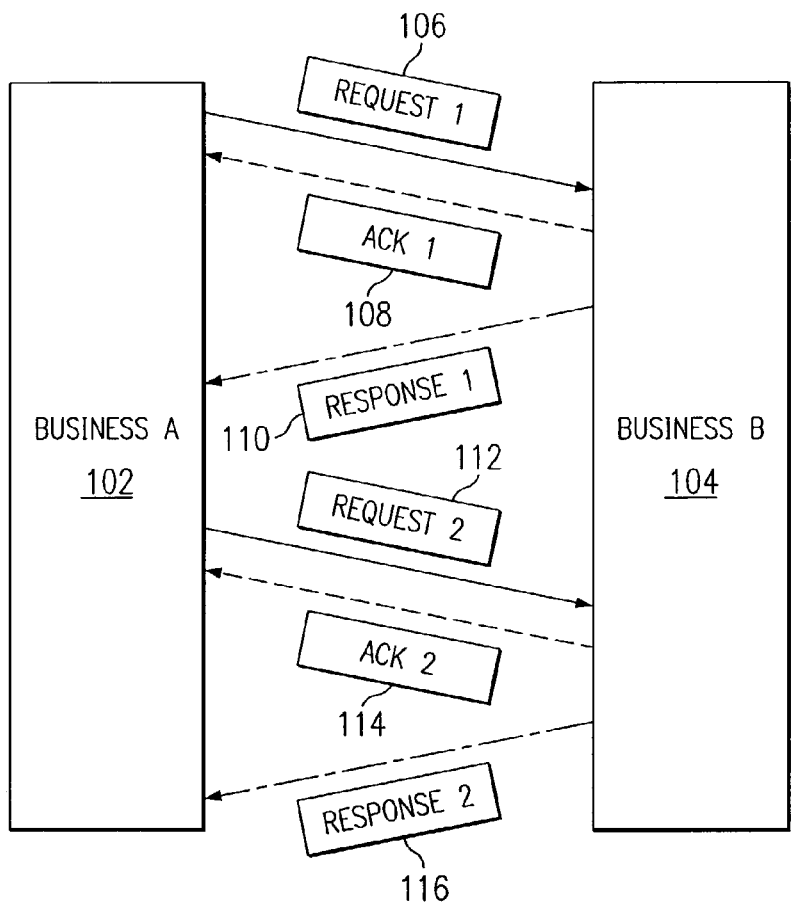
FIG. 1 depicts a block diagram of a typical prior art business-to-business interaction is depicted.
Figure 2:
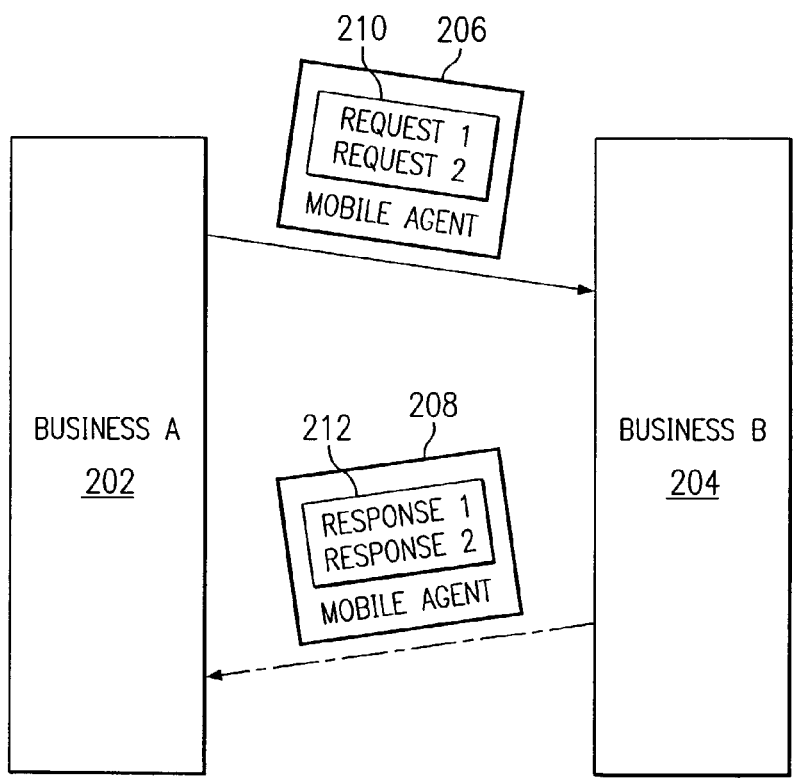
FIG. 2 depicts a block diagram of mobile agent technology illustrating the problems with prior methods of implementing mobile agents.
Figure 3:
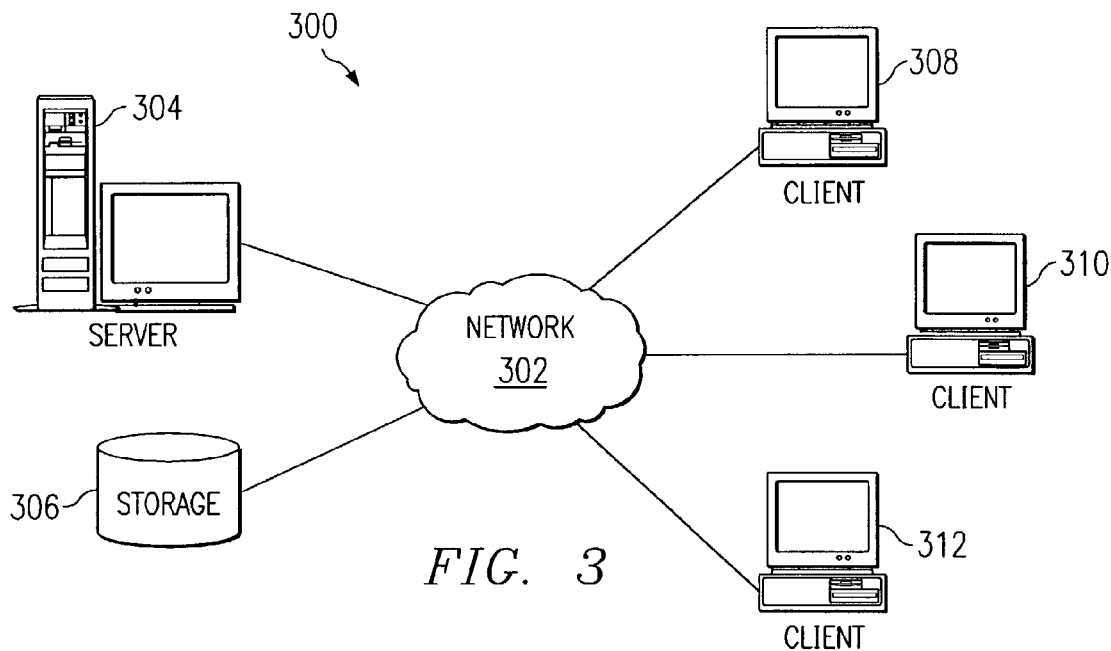
FIG. 3 depicts a pictorial representation of a network of data processing systems in which the present invention may be implemented.

With reference now to the figures, FIG. 3 depicts a pictorial representation of a network of data processing systems in which the present invention may be implemented. Network data processing system 300 is a network of computers in which the present invention may be implemented. Network data processing system 300 contains a network 302, which is the medium used to provide communications links between various devices and computers connected together within network data processing system 300. Network 302 may include connections, such as wire, wireless communication links, or fiber optic cables.

In the depicted example, service provider 304 is connected to network 302 along with storage unit 306. In addition, requesting partners 308, 310, and 312 are connected to network 302. These requesting partners 308, 310, and 312 may be, for example, personal computers or network computers. hi the depicted example, server 304 provides data, such as boot files, operating system images, and applications to clients 308-312. Requesting partners 308, 310, and 312 are requesting partners to service provider 304. Network data processing system 300 may include additional servers, clients, and other devices not shown. In the depicted example, network data processing system 300 is the Internet with network 302 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the present invention.

Figure 4:
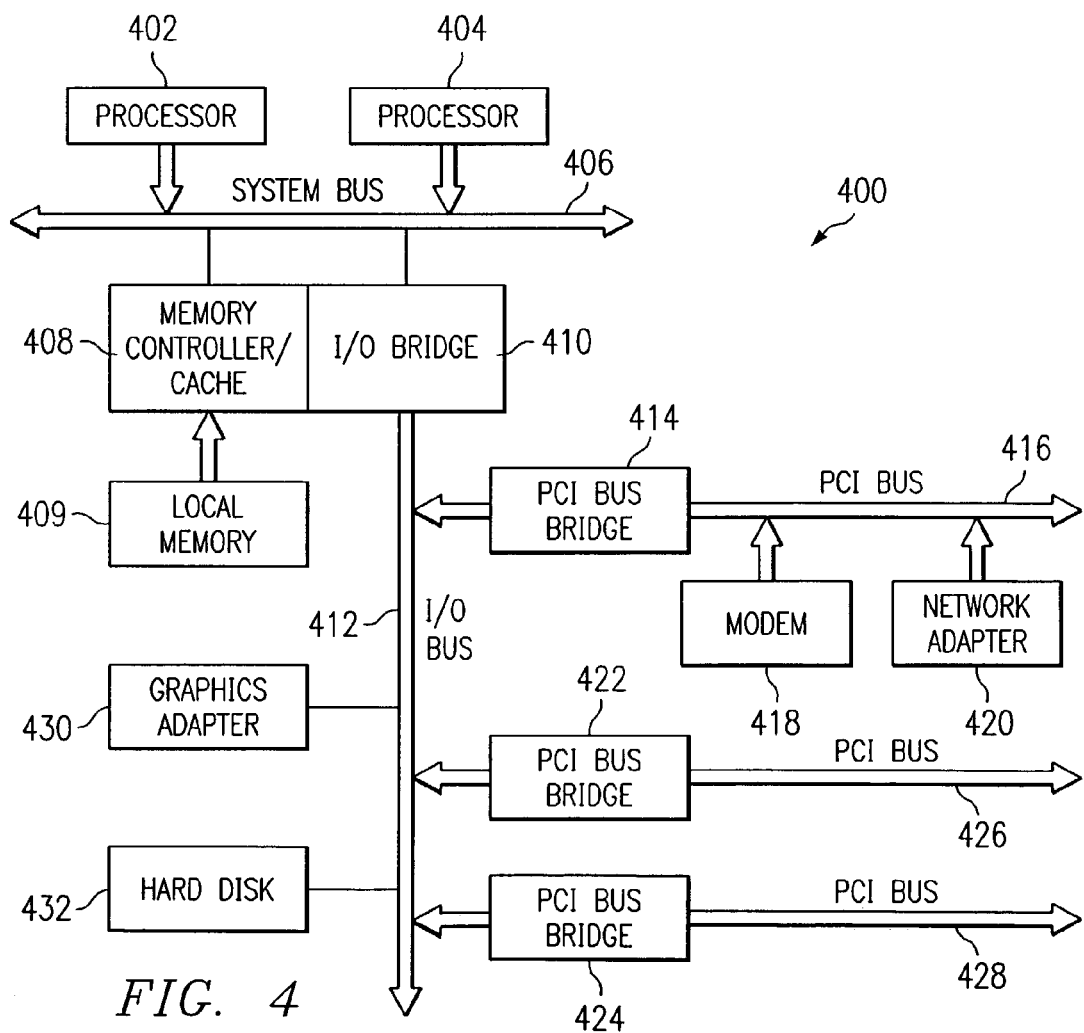
FIG. 4 depicts a block diagram of a data processing system that may be implemented as a server in accordance with a preferred embodiment of the present invention.

Referring to FIG. 4, a block diagram of a data processing system that may be implemented as a server, such as service provider 304 in FIG. 3, is depicted in accordance with a preferred embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to clients 308-312 in FIG. 3 may be provided through modem 418 and network adapter 420 connected to PCI local bus 416 through add-in boards.

Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM e-Server pSeries system, a product of International Business Machines Corporation in Armonk, N.Y., running the Advanced Interactive Executive (AIX) operating system or LINUX operating system.

Figure 5:
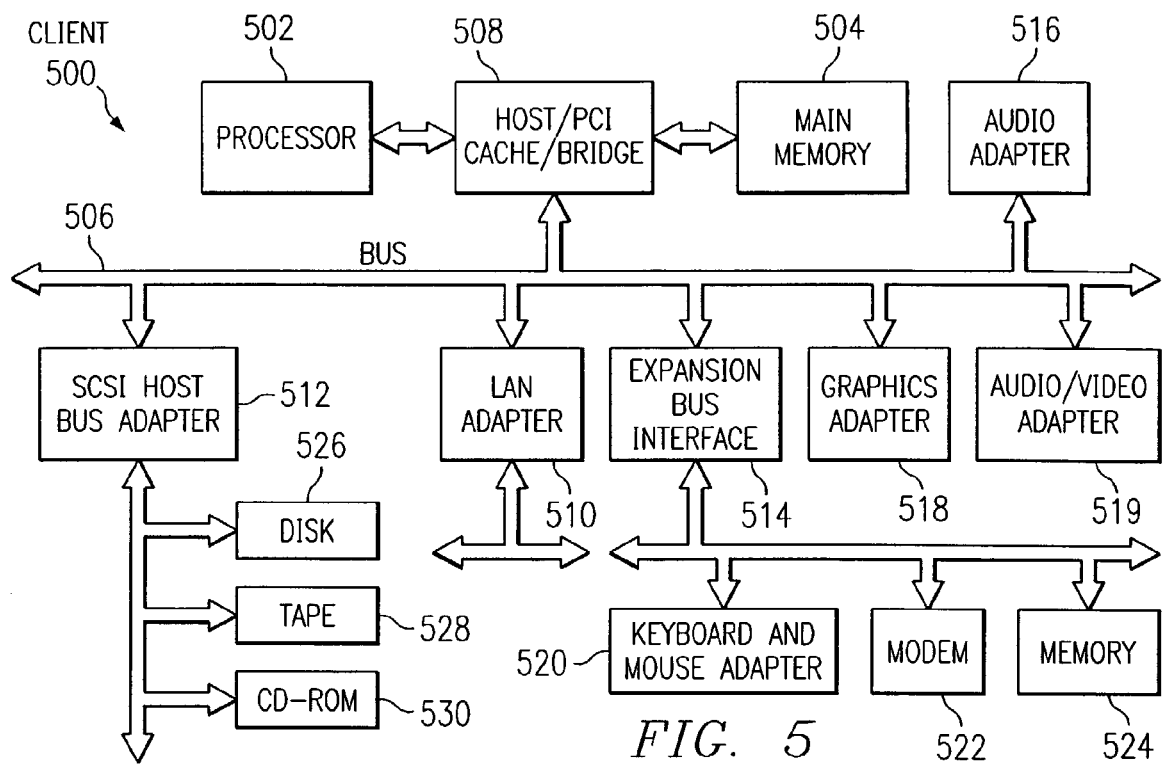
FIG. 5 depicts a block diagram illustrating a data processing system in which the present invention may be implemented.

With reference now to FIG. 5, a block diagram illustrating a data processing system is depicted in which the present invention may be implemented. Data processing system 500 is an example of a requesting partner computer. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. Small computer system interface (SCSI) host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as Windows 2000, which is available from Microsoft Corporation. An object oriented programming system such as Java may run in conjunction with the operating system and provide calls to the operating system from Java programs or applications executing on data processing system 500. "Java" is a trademark of Sun Microsystems, Inc. Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

As another example, data processing system 500 may be a stand-alone system configured to be bootable without relying on some type of network communication interface, whether or not data processing system 500 comprises some type of network communication interface. As a further example, data processing system 500 may be a personal digital assistant (PDA) device, which is configured with ROM and/or flash ROM in order to provide non-volatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

The present invention of composite business interactions, referred to herein as transactors, addresses these problems of mobile agents while providing a simple (quick and easy-to-use) framework.

Figure 6:
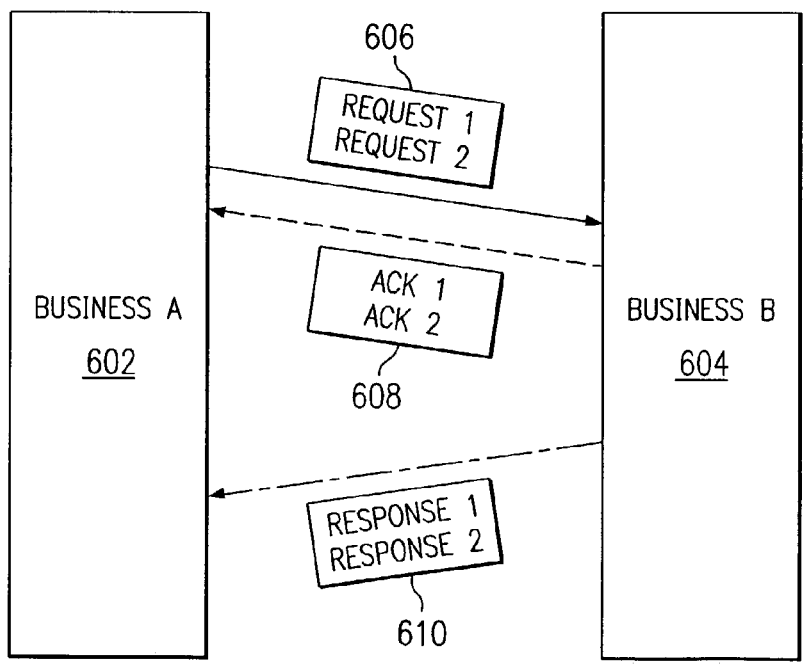
FIG. 6 depicts a block diagram of a composite business-to-business interaction in accordance with the present invention.

Composite interactions, as shown in FIG. 6, combine multiple request/response interactions allowed by the provider. This reduces latency since the client need only make one invocation instead of many. Further, it simplifies business logic while supporting disconnected operation. The composite asynchronous request is processed at the server business including logic that in the simple interaction scenario was at the client end. Thus, business A 602 submits both the request 1 and 2 in a request packet 606 that is sent to business B 604. The request packet 606 includes code or information, as described more fully below, to specify how the requests are to be processed, such as in what order and conditions that are to be applied. Business B 604 then sends back a single acknowledgment packet 608 acknowledging both request 1 and 2. Once business B 604 has finished processing the request, a single response packet 610 containing the results for both requests 1 and 2 is sent back to business A 602.

In a preferred embodiment, with reference now to FIGS. 7A-7B, diagrams illustrating a transactor input and output message data structures are depicted in accordance with the present invention. A transactor input message 700 data structure sent by the requesting data processing machine to the recipient contains three parts: a message header 702, and a payload consisting of a transactor 704, and an input message set 706. The specification of transactor follows the allowable composition rule and allowable request as specified in a service contract.

The service contract formally specifies and describes the rules for interacting with a service. This formal description extends the service contract specification introduced in U.S. Pat. No. 6,148,290 issued Nov. 14, 2000 which is incorporated herein by reference and includes supported composition construct, specification of composite request and response format, and supported integrity rules constructs, e.g., transaction, and any additional constraints on request composition. The service contract also defines [as describes] allowable actions, request response relationship for each action and constraints on invocation of an action.

The message header 702 includes such information as an identification and name of the sender (or requester). The transactor 704 contains the actions to be performed by the recipient business data processing system and the relationships between the actions. Examples of actions are reservations and purchases. Examples of relationships include the order in which to process requested actions, whether to perform all or none of the requests in cases in which one request may fail, and branching dependencies in which one of two or more branches of actions is selected based on the result of another action. The input message set 706 includes input messages and identifications. For example, in the case of a request to reserve a hotel room, the input message may contain text or other information indicating that the hotel reserved should be a 5 star hotel or that the hotel should be close to the airport.

The transactor output message 708 data structure sent by the recipient of the request to the requestor after the request has been processed includes a message header 710, transactor 712, and output message set 714. The message header 710 includes, for example, an identification and name of the sender of the request. The transactor 712 includes the actions and relationships as received from the transactor input message 700, thus allowing the sender to verify that the results received correspond to the actions and relationships specified in the request. The output message set 714 includes output messages and identifications which indicate the result of the requests as processed by the recipient.

With reference now to FIGS. 8A-8B, diagrams illustrating an exemplary transactor data structure input message and output message are depicted in accordance with the present invention. The message components of a transactor input message set 800, 820, 822, 824, may be written in, for example, a markup language such as, extensible markup language (XML), hypertext markup language (HTML), or other language, such as, for example, electronic data interchange (EDI). The input message ID 802 is "Air-reserve" and the message is reserve an airline. Input message ID's 803 and 806 are "Hotel1-reserver" and "Hotel2-reserver" respectively with corresponding messages instructing recipient business to reserve a hotel.

Transactor output message 810 includes output message action ID's 812-816 that correspond to input message ID's 802-806 thus informing the sender as to which input message 820-824 each output message 830-834 corresponds. Each output message 830-834 provides the result or response to the corresponding input messages 820-824.

With reference now to FIGS. 9A-9B, diagrams illustrating exemplary portions of a transactor data structure are depicted in accordance with the present invention. As discussed above, the transactor 704 includes a definition of relationships between actions. In FIG. 9A, actions 904 and 906 are grouped as a combination which indicates that the recipient data processing system should perform both actions. In FIG. 9B, the group type is labeled "selection" which indicates that the recipient of the request should do one or the other of actions 908 and 910, but not both. Thus, in the depicted example, the recipient data processing system would reserve either hotel 1 or hotel 2 but not both.

With reference now to FIGS. 10A-10B, diagrams illustrating exemplary portions of a transactors data structure in FIGS. 9A-9B with additional criteria are depicted in accordance with the present invention. In FIGS. 10A-10B, actions 1002-1008 are grouped as depicted. However, in addition to grouping the actions 1002-1008 as in FIGS. 9A-9B, the actions are also ordered 1010-1012. Thus by including the ordered 101-1012 instruction, the recipient of the request is instructed to perform the actions in the order listed. Thus, in FIG. 10A, the action of "reserve airline" is performed before the action "reserve hotel 1." Thus, in FIG. 10A, the recipient of the request performs both actions 1002-1004 but the actions 1002-1004 are performed in the order listed. In FIG. 10B, the recipient first attempts to reserve hotel 1 and then, if unsuccessful, attempts to reserve hotel 2. Therefore, a business, person or other entity can specify a preferred hotel as well as alternative hotels if the preferred hotel is unavailable.

With reference now to FIG. 11, a diagram illustrating another example of conditions that may be placed in a transactor data structure is depicted in accordance with the present invention. In this example, the transactor includes actions 1108 and 1110, a group type 1102, an indication 1104 of whether the actions 1108 and 1110 are ordered and an indication if the actions are atomic 1106. The group type 1102 is "combination" which specifies that the actions 1108 and 1110 should be performed as a combination and that if either action 1108 and 1110 fails, the entire action fails. The ordered 1104 criteria in the depicted example is "yes" indicating that action 1108, reserve airline, should be performed before action 1110, reserve hotel 1. The atomic 1106 criteria in the depicted example is "yes" indicating that the actions 1108 and 1110 cannot be broken up into any smaller subgroups.

With reference now to FIG. 12, a diagram illustrating a portion of a transactor data structure illustrating hierarchical groups is depicted in accordance with the present invention. In this example, the recipient of the request is instructed to perform action 1202 first and then perform one of either action 1204 or action 1206. This is because action 1202 is grouped in "combination" with actions 1204 and 1206, but actions 1204 and 1206 are grouped with group type "selection" indicating that only one of actions 1204 and 1206 is to be performed. Furthermore, because actions 1204 and 1206 are ordered, the recipient attempts to perform action 1204 first and then, if that fails, to perform action 1206. With hierarchical grouping a complex request can be easily composed.

With reference now to FIG. 13, a diagram illustrating an exemplary portion of a transactor data structure illustrating integrity rules is depicted in accordance with the present invention. Integrity rule specifies a constraint that must be satisfied during the execution of a request group. In addition to other rules as discussed above, the actions 1302-1308 may be grouped by integrity rule. In the depicted example action groups 1310 and 1312 are grouped with group type "selection" indicating that only one of the actions groups 1310 and 1312 will be performed. Thus, in the depicted example, the actions 1302-1304 are grouped together as a combination with an integrity rule of all-or-fail. Thus, both actions 1302-1304 are performed, however, if one of the actions fails, both actions fail. If action group 1310 fails as a result of either action 1302 or action 1304 failing, then action group 1312 is performed. Action group 1312 is also grouped by integrity rule indicating that both actions 1306 and 1308 should be performed or none performed. The "all-or-fail" integrity rule is just one of many types of integrity rule. Other types of integrity rules may include a rule that at least one of the actions is performed.

With reference now to FIG. 14, a diagram illustrating an exemplary portion of a transactor data structure is depicted in accordance with the present invention. In this example, the concept of input/output (IO) redirection is illustrated with two actions 1408 and 1410. Each action 1408 and 1410 includes an action ID 1402 and 1404 and an input ID 1412 and 1406. The input to action 1410, pay for reservation, is the action ID 1402 for action 1408, reserve hotel 1. Thus, this ensures that the step of paying for the reservation credits the appropriate entity.

With respect to FIG. 15, a block diagram illustrating an exemplary transactor implementation in accordance with the present invention. In the depicted example, a transactor 1502 (i.e., the recipient of the action request, such as business B in FIG. 5), receives a transactor consisting of two requests tid-1 and tid-2 each with a unique identifier. The initiator 1506 of the transaction requests tid-1 and tid-2 contains persistent storage 1508 to store the parameters related to the requested actions. Transactor 1502 stores the request in persistent storage 1504 and executes the various requests which may involve sending requests to other data processing systems. The action responses 1510 from other data processing systems may be stored in persistent storage 1512 in each of the other data processing systems. Furthermore, the action responses 1510 received by transactor 1502 may be stored in persistent storage 1504.

In addition to storing the transactor requests received by transactor 1502, persistent storage 1504 stores the results of intermediate stages of the process as well as an indication of which step needs to be performed next. Furthermore, if a system failure occurs or one of the steps fails, the entire set of actions responses previously processed is not lost. Each action to be performed by transactor 1502 need not be synchronized if there is no order specified.

By grouping multiple requests into a single request packet with definitions defining the relationships between request actions, such as which action to perform first and dependencies upon other actions, a user may save significant time in not needing to await a response from one request before sending another request or choosing a course of action. Furthermore, by structuring the requests as described above, the security of the system processing the requests is not compromised since arbitrary code is not executed on the responding system, but rather only a limited number of well defined actions are performed. Furthermore, the requests received by the data processing system comprise high level actions that need to be executed such as, for example, purchasing airline tickets, and do not constitute code that is executed on the target machine. Rather, the target machine interprets the request and executes the requests using its own code that is independent from the representation of the requests. Thus, two different computing systems could be configured to read the same set of requests, but would execute the requests with different code and in different manners.

Although the present invention has been described primarily in the context of processing requests sent between data processing systems via a network, the transactors utilized in sending these requests could also be utilized locally within an individual data processing system for ease of expression of higher level business logic. Thus, a user may simply express business objectives or goals in the higher logic of the transactor, and the local system then interprets the transactor in order to perform actions necessary in implementing the business objective or goals. This eliminates the need for the user to be familiar with the particular coding required on a machine for implementing the business objectives, and allows the user to focus his or her efforts on the larger picture. Note in this scenario, there may not be any explicit contract with local system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing service requests in a network environment, the method comprising:
   receiving a request with defined allowable actions and request definition compositions, wherein the request comprises a plurality of actions with defined relationships between the plurality of actions;
   processing the plurality of actions according to the defined relationships;
   generating a response to the plurality of actions; and
   wherein each action renders a reportable service, and formats of the request definition compositions and the defined relationship are defined by a service contract between a requester and a service provider, wherein the defined relationships comprises integrity rules to be followed during execution of the request, said rules comprising at least two of specifying a priority order in which the actions are to be executed, instructions that no action is to be finalized unless all of the actions can be finalized, and instructions that the actions are to be executed until a constraint specification is violated.

2. The method as recited in claim 1, wherein the request definition compositions comprise instructions for selection of an action for execution from a group of the plurality of actions.

3. The method as recited in claim 1, wherein the request definition compositions comprise instructions for execution of a group of actions from the plurality of actions.

4. The method as recited in claim 1, wherein the request comprise groups of actions organized in hierarchical groups and wherein the request definition compositions comprise instructions regarding order of execution of actions within groups and order of execution of groups.

5. The method as recited in claim 1, wherein the defined relationships comprise instructions to use the resulting output of one of the plurality of actions as the input of another one of the plurality of actions.

6. The method as recited in claim 1, wherein the plurality of actions are arranged in groups of actions with varying definitions defining relationships between actions within a group and between various groups.

7. The method as recited in claim 1, wherein the integrity rules may be applied at a group level.

8. The method as recited in claim 1, wherein the request is generated, received, processed, and the response generated in a local environment.

9. The method as recited in claim 1, wherein the request comprises a message header, a transactor, and an input message set, wherein the transactor comprises a plurality of actions and relationships between the plurality of actions and the input message set comprises a plurality of input messages and input identifications.

10. The method as recited in claim 9, wherein the message header includes a sender identification.

11. The method as recited in claim 1, wherein the response comprises a message header, a transactor, and an output message set, wherein the output message set comprises a plurality of output messages and output identifications.

12. The method as recited in claim 1, wherein the defined allowable actions and request definition compositions are defined by a service contract.

\* \* \* \* \*